(12) United States Patent
Kim et al.

(10) Patent No.: US 7,636,591 B2
(45) Date of Patent: Dec. 22, 2009

(54) TWO-WAY SLIDING MOBILE TERMINAL

(75) Inventors: Sang Beom Kim, Durham, NC (US); Ivan Nelson Wakefield, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 659 days.

(21) Appl. No.: 11/380,734

(22) Filed: Apr. 28, 2006

(65) Prior Publication Data

US 2007/0254730 A1 Nov. 1, 2007

(51) Int. Cl.
*H04M 1/00* (2006.01)

(52) U.S. Cl. ............................... 455/575.4; 379/433.12

(58) Field of Classification Search .............. 455/550.1, 455/575.1, 575.3, 575.4; 379/428.01, 433.01, 379/433.11, 433.12, 440
See application file for complete search history.

(56) References Cited

U.S. PATENT DOCUMENTS

| | | | |
|---|---|---|---|
| 6,665,173 B2 | 12/2003 | Brandenberg et al. | |
| 6,850,226 B2 * | 2/2005 | Finke-Anlauff | 345/169 |
| 7,016,182 B2 | 3/2006 | Brandenberg et al. | |
| 7,142,420 B2 | 11/2006 | Santos et al. | |

(Continued)

FOREIGN PATENT DOCUMENTS

| | | | |
|---|---|---|---|
| EP | 1 592 209 A2 | 11/2005 | |
| EP | 1 594 289 A2 | 11/2005 | |
| EP | 1 821 500 A2 | 8/2007 | |
| EP | 1 834 470 A0 | 9/2007 | |

(Continued)

OTHER PUBLICATIONS

Sony Ericsson Mobile Communications AB et al, International Patent Application No. PCT/US2006/061107, International Search Report and Written Opinion, dated Feb. 18, 2008.

(Continued)

*Primary Examiner*—Nhan T Le
(74) *Attorney, Agent, or Firm*—Matthew W. Witsil; Moore & Van Allen PLLC

(57) ABSTRACT

A mobile terminal that allows sliding between housings in two directions. The housings may slide in longitudinal and lateral relative directions. One position, for example, may be for PDA use with an alphanumeric keypad exposed and another position may be for phone use with a numeric keypad exposed. One housing may include pins that extend from one surface and another housing may include grooves in an opposing surface to receive the pins. At least one longitudinal groove may be provided, and in one embodiment two lateral grooves are provided to accommodate two longitudinally aligned pins. An overlay may be provided that may be exposed to cover keys with numbers or navigation indications when the housings slide longitudinally and may remain hidden when the housings slide laterally with respect to each other. A casing may be provided that substantially encloses the bottom housing when in the closed position.

50 Claims, 14 Drawing Sheets

U.S. PATENT DOCUMENTS

| | | | |
|---|---|---|---|
| 7,184,806 B2 * | 2/2007 | Bae | 455/575.4 |
| 7,400,916 B2 * | 7/2008 | Lee et al. | 455/575.4 |
| 7,437,186 B2 * | 10/2008 | Park | 455/575.4 |
| 2005/0255897 A1 * | 11/2005 | Lee et al. | 455/575.4 |
| 2006/0046796 A1 | 3/2006 | Park et al. | |
| 2006/0061943 A1 | 3/2006 | Santos et al. | |
| 2006/0146014 A1 | 7/2006 | Lehtonen | |

FOREIGN PATENT DOCUMENTS

| | | |
|---|---|---|
| WO | 2004057843 A1 | 7/2004 |
| WO | 2005071928 A1 | 8/2005 |
| WO | 2006041238 A1 | 4/2006 |

OTHER PUBLICATIONS

"Samsung SPH-B5200 Gaming Phone", http://www.techeblog.com/indpex.php/tech-gadget/samsung-sph-b5200-gaming phone, Mar. 14, 2006, pp. 1-5.

Sony Ericsson Mobile Communications AB et al, International Patent Application No. PCT/US2006/061107, International Preliminary Report on Patentability, dated Jul. 24, 2008.

* cited by examiner

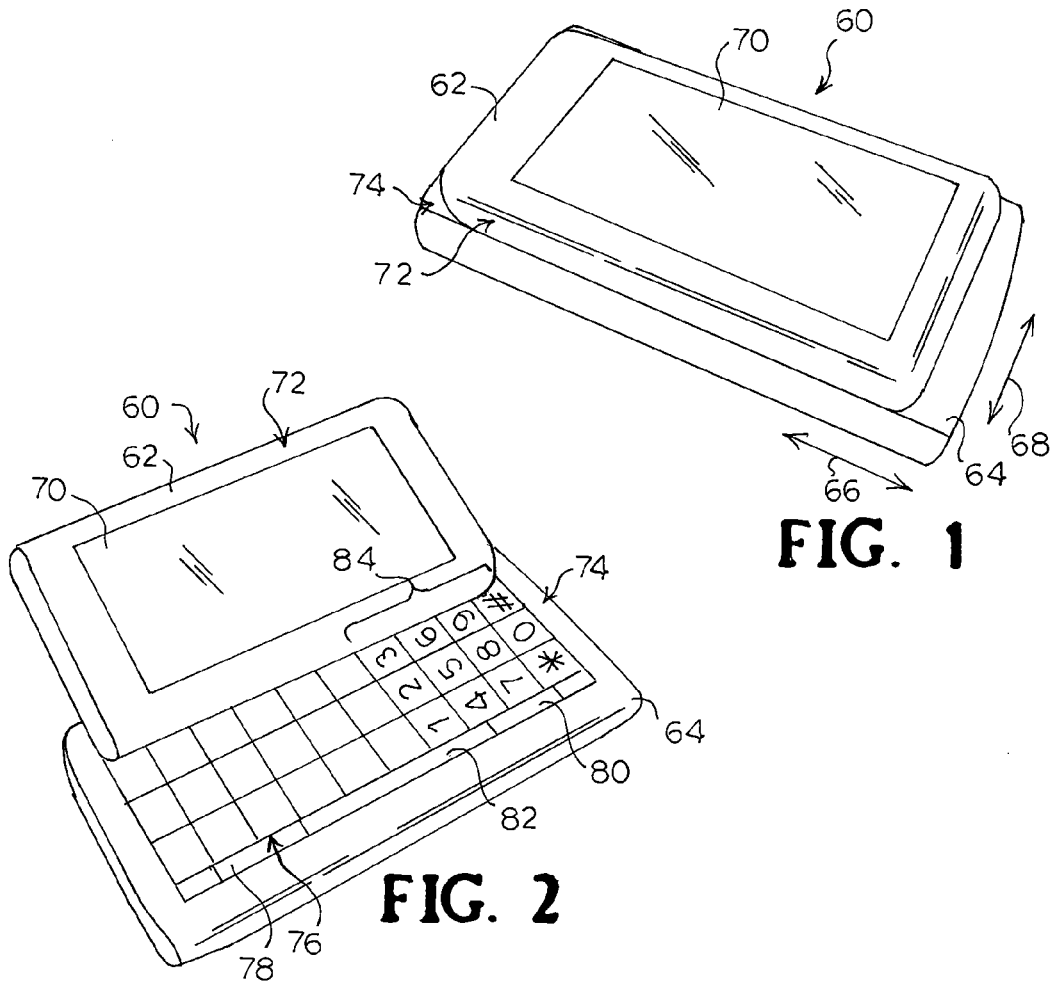
FIG. 1
FIG. 2
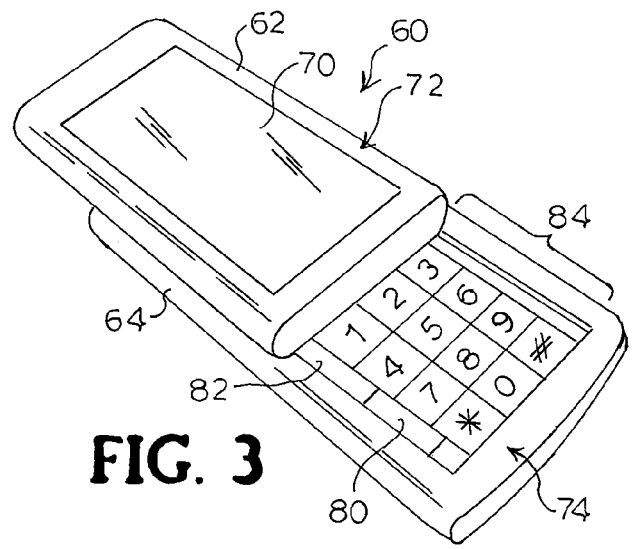
FIG. 3

TWO-WAY SLIDING MOBILE TERMINAL

BACKGROUND

Design of mobile terminals may include a combination of functional, ergonomic, and aesthetic characteristics such as overall size, display size, ease of keypad use, availability of functions, appearance, and feel. Different designs may be selected to provide emphasis on desirable features that are reflected in device housing configurations.

Mobile terminals, such as cellular phones and personal digital assistants (PDAs), feature a variety of housing configurations. There are, for example, flip designs, "jack-knife" designs, and "candy bar" designs. Flip designs may include a flip portion mounted to an end of a housing with one or more hinges along the end of the housing. The operative faces of the flip and housing oppose each other when the flip is closed and are exposed when the flip is open. Jack-knife designs may include two housings, where one housing is rotatably mounted to the other housing with a pin-type connection made across the thickness of the housings, disposed at one end of the terminal when the housings are in the closed position. The operative face of one housing is always exposed, while the operative face of the other housing is hidden when the terminal is closed and is exposed when the terminal is open. Candy bar designs include a single housing, and are elongated, suggestive of a candy bar shape. Other designs include substantially planar, single housings. These designs may have a larger form factor than the other designs, but may also accommodate more keys or buttons.

Many mobile terminals currently include full "qwerty" keypads, with numeric keys hidden within the keypad and accessible for use by depressing a function key first. Such a design reduces the number of keys required, but may make it difficult to identify and use the numeric keys. Most mobile terminals that include such keypads do so with the substantially planar, single housing design, and have the keypad and display on the same operative face of the housing. Incorporating a display and a keypad into the same face, however, results in a screen size substantially smaller than the face, possibly with keys too small to easily use with one's fingers. Many terminals with full keypads also do not have the form factor of a phone that users are accustomed to and may prefer.

SUMMARY OF THE INVENTION

In accordance with an embodiment of the present invention, a two-way sliding mobile terminal is provided, including a first housing and a second housing. The first housing includes a first housing inner face and a first housing outer face, and has a longitudinal axis. At least one pin projects from the first housing inner face. The second housing includes a second housing inner face and a second housing outer face. The second housing inner face opposes the first housing inner face, and includes at least one longitudinal groove parallel to the longitudinal axis. There is at least one lateral groove perpendicular to and intersecting the longitudinal groove or grooves in the second housing inner face. One or more pins slide in a groove or grooves. The pin and groove arrangement may result in the ability to slide the housings longitudinally and laterally relative to each other.

In accordance with another embodiment of the present invention, there may be a central overlay between the first and second housings, which may, for example, overlay a keypad depending on the relative positions of the housings to alter the labels on the keys. The functions of the keys may change depending on housing position.

In accordance with another embodiment of the present invention, a two-way sliding mobile terminal includes a first housing having a longitudinal axis and including a first housing inner face and two pins projecting from the first housing inner face in longitudinal alignment. A second housing includes a second housing inner face opposing the first housing inner face with one longitudinal groove parallel to the longitudinal axis and two lateral grooves perpendicular to and intersecting the longitudinal groove. The two pins may slide in the longitudinal groove, and each pin may slide in a lateral groove. The first and second housings can slide in longitudinal and lateral directions relative to each other. In a first position the housings are in registration, in a second position the housings are laterally offset, and in a third position the housings are longitudinally offset.

In accordance with another embodiment of the present invention, a two-way sliding mobile terminal includes a first housing. The first housing includes a first housing first face and a first housing second face, and has a longitudinal axis. A second housing includes a second housing inner face and a second housing outer face, and the second housing inner face opposes the first housing first face. There are first means for sliding integral with the first housing, and second means for sliding integral with the second housing. The first and second means for sliding come together to allow relative sliding of the housings in the longitudinal and lateral directions.

In accordance with another embodiment of the present invention, a two-way sliding mobile terminal is provided, including a first housing, a second housing, and a casing. The first housing includes a first housing first face and a first housing second face, and has a longitudinal axis. At least one pin projects from the first housing first face. The second housing includes a second housing inner face and a second housing outer face. The second housing inner face opposes the first housing inner face, and includes at least one longitudinal groove parallel to the longitudinal axis. There is at least one lateral groove perpendicular to and intersecting the longitudinal groove in the second housing inner face. One or more pins slide in a groove or grooves. The casing is mounted to the second housing and has an inner face opposing the first housing second face.

In accordance with another embodiment of the present invention, a two-way sliding mobile terminal includes a first housing having a longitudinal axis and including a first housing first face, a first housing second face, and two pins projecting from the first housing first face in longitudinal alignment. A second housing includes a second housing inner face opposing the first housing first face, a second housing outer face, one longitudinal groove parallel to the longitudinal axis, and two lateral grooves perpendicular to and intersecting the longitudinal groove. A casing is mounted to the second housing and includes a casing inner face opposing the first housing second face. The two pins may slide in the longitudinal groove, and each pin may slide in a lateral groove. The first and second housings can slide in longitudinal and lateral directions relative to each other. In a first position the housings are in registration, in a second position the housings are laterally offset, and in a third position the housings are longitudinally offset.

In accordance with another embodiment of the present invention, a two-way sliding mobile terminal includes a first housing, and second housing, and a casing. The first housing includes a first housing first face and a first housing second face, and has a longitudinal axis. At least one pin projects from the first housing first face. The second housing includes a second housing outer face and a second housing inner face, and the second housing inner face opposes the first housing first face. The casing is mounted to the second housing and includes a casing inner surface. The casing inner surface opposes the first housing second face and includes at least one longitudinal groove parallel to the longitudinal axis and at least one lateral groove perpendicular to and intersecting the at least one longitudinal groove. At least one pin may slide in a groove or grooves.

In accordance with another embodiment of the present invention, a two-way sliding mobile terminal includes a first housing, a second housing, and a casing. The first housing includes a first housing first face and a first housing second face and has a longitudinal axis, and includes at least one longitudinal groove parallel to the longitudinal axis and at least one lateral groove perpendicular to and intersecting the longitudinal groove or grooves. The second housing includes a second housing outer face and a second housing inner face, and the second housing inner face opposes the first housing first face. The casing is mounted to the second housing and includes a casing inner face opposing the first housing second face. At least one pin projects from the casing inner face and one or more pins disposed for sliding in at least one groove.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF DRAWINGS

FIG. 1 is a top perspective view of an embodiment of a two-way sliding mobile terminal according to the present invention, in a closed position.

FIG. 2 is a top perspective view of the mobile terminal of FIG. 1 in an open position.

FIG. 3 is a top perspective view of the mobile terminal of FIG. 1 in another open position.

DETAILED DESCRIPTION OF THE INVENTION

Figure 4:
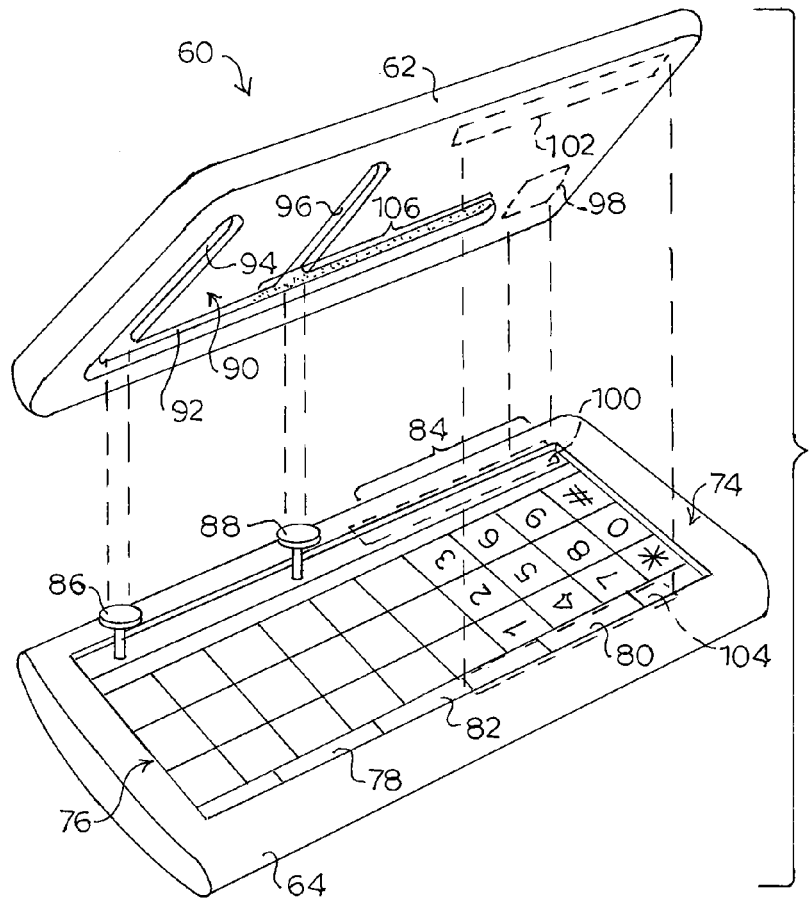
FIG. 4 is an exploded view of the mobile terminal of FIG. 1.
Figure 5:
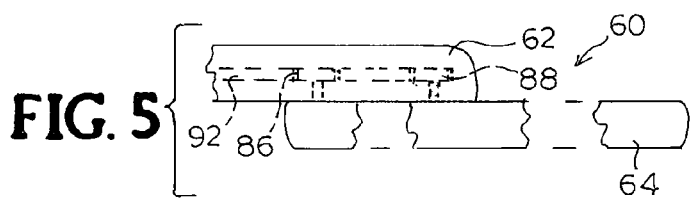
FIG. 5 is a partial side elevation view of the mobile terminal of FIG. 1, in the position of FIG. 3.

Certain terminology is used herein for convenience only and is not to be taken as a limitation on the invention. For example, words such as "top," "bottom," "upper," "lower," "horizontal," "vertical," "inner," "outer," "upward," and "downward" merely describe the configuration shown in the figures. It is understood that the components may be oriented in any direction and the terminology, therefore, should be understood as encompassing such variations unless specified otherwise.

As used herein, the term "mobile terminal" may include, among other things: a palmtop receiver or other appliance; a cellular radiotelephone with or without a multi-line display; a hand held phone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a calculator; a handheld game or controller; and a personal music playback system such as for CDs, minidisks, MP-3 files, memory sticks, or the like.

Referring now to the drawings, FIGS. 1-6 show an embodiment of a two-way sliding mobile terminal 60 in accordance with the present invention. The terminal 60 includes a top housing 62 and a bottom housing 64. FIG. 1 shows the terminal 60 with the housings 62, 64 centrally located in a closed position where the bottom housing 64 is largely covered by the top housing 62. The terminal 60 may be described in terms of longitudinal and lateral directions, with the longitudinal direction 66 being along the longer dimension and the lateral direction 68 being perpendicular to the longitudinal direction and along the shorter dimension. There is a display 70 in the top or outer face 72 of the top housing 62, and although not shown there could be components such as function keys, navigation keys, or a joystick. In this embodiment a small portion of the top or inner face 74 of the top housing 62 may be seen. FIG. 2 shows the terminal 60 with the housings 62, 64 disposed, by laterally sliding, in an open position. In the position shown, a "qwerty" keypad 76 is viewed (though letters are not shown) on the top face 74 of the bottom housing 64, with a shift key 78, an "alt." key 80, and a space bar 82. The terminal 60 may be referred to as being in PDA/blog/web mode, though other uses are possible and within the scope of the present invention. Additional buttons and keys as may be included on mobile terminals are not shown. Certain dual use keys 84 input numbers as well as letters. The numbers may be accessed with a function key, such as the "alt." key 80. Alternatively, FIG. 3 shows the terminal 60 with the housings 62, 64 disposed by longitudinally sliding in another open position. In this position a numeric keypad made up of the dual use keys 84 is viewed, and the terminal 60 may be referred to as being in phone mode, though again other uses are possible and within the scope of the present invention. The numbers are sideways in the alphanumeric keypad of FIG. 2 so that they will be upright in the position of FIG. 3 and in the position of a standard telephone keypad.

FIG. 4 shows the inner workings of the housings 62, 64. Pins 86, 88 extend upward from the top face 76 of the bottom housing 64 into grooves 92, 94, 96 in the bottom face 90 of the top housing 62. The pins 86, 88 are in alignment longitudinally, and may or may not be integral with the bottom housing 64. A longitudinal groove 92 allows relative longitudinal sliding of the housings 62, 64. Lateral grooves 94, 96, intersecting the longitudinal groove 92, are positioned such that their spacing is the same as the spacing between the pins, 86, 88, and the lateral grooves 94, 96 concurrently accept the pins 86, 88 to allow lateral sliding. When the terminal 60 is in the closed position, the pins 86, 88 are in alignment with both the longitudinal and lateral grooves 92, 94, 96, so the housings 62, 64 may slide either direction relative to each other. Magnets 98, 100, 102, 104 are provided to assist in keeping the terminal 60 in the closed position with the housings 62, 64 in close proximity to each other; although not shown in subsequent embodiments it is to be understood that magnets may be used throughout.

While numbers may be used in the position of FIG. 2, most likely with a function key, for use as a phone the position of FIG. 3 is probably more desirable. The terminal 60 may be configured, for example, electrically or by mechanical switch or magnets, to automatically input numbers rather than letters when the terminal is in the position of FIG. 3. An electrical configuration might use an electrical conductor 106, as shown in FIG. 4, along part of the longitudinal groove 90 such that a circuit is completed or shorted depending on pin location. In this embodiment, which is in the PDA mode, only one pin contacts the conductor 106, and the circuit is completed; when both pins contact the conductor 106 the circuit is shorted, as would be the case in this embodiment when in phone mode. Other devices that could be used include, but are not limited to, those relying on the Hall effect, such as magnetic sensors in general, reed switches, and others as selected by one of ordinary skill in the art. Such possible configurations apply to all embodiments of the present invention.

The pins 86, 88 in this embodiment may be shaped with a shank and a flat, round head as shown, but the pins could be any shape that allows them to be secured in the grooves 92, 94, 96, which also secures the housings 62, 64 together. For example, a pin with a cross shaped head or square head could be used. The grooves 92, 94, 96 may be T-shaped in cross-section, or other shape that receives the pins. Additional pins could be provided, and would necessitate the addition of more grooves. However, other means for securing the housings 62, 64 together may be achieved, in which case the pins could be straight, without heads, or other shapes where they are not secured in the grooves. Accordingly, the grooves could be straight-walled as well. Consideration for quantity and placement of pins and grooves includes maintaining alignment of the housings 62, 64 and controlling the degree of exposure of the bottom housing top face 76 when in an open position.

Figure 6:
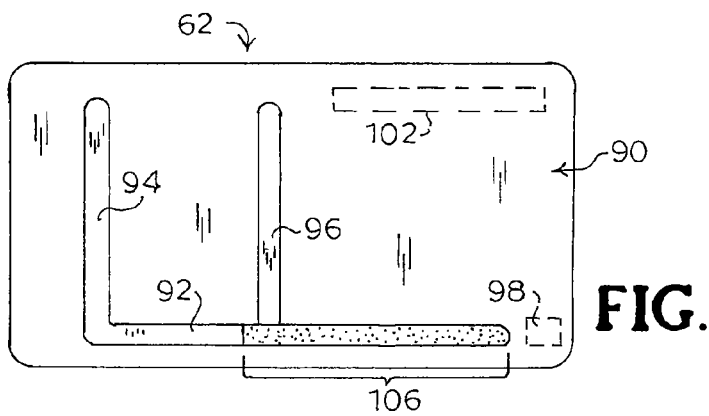
FIG. 6 is a bottom plan view of the top housing of the mobile terminal of FIG. 1.

FIG. 6 shows the bottom face 90 of the top housing 62, with the longitudinal groove 92 along an edge, placed to maximize the exposure of the bottom housing 64 when slid laterally. The lateral grooves 94, 96 may be placed, for example, to maintain alignment of the housings 62, 64 and to expose about one half of the bottom housing 64 when slid longitudinally. As an alternative to the orientation shown of pins 86, 88 and grooves 92, 94, 96, the pins 86, 88 could extend from the top housing 62 into grooves in the bottom housing 64.

Figure 7:
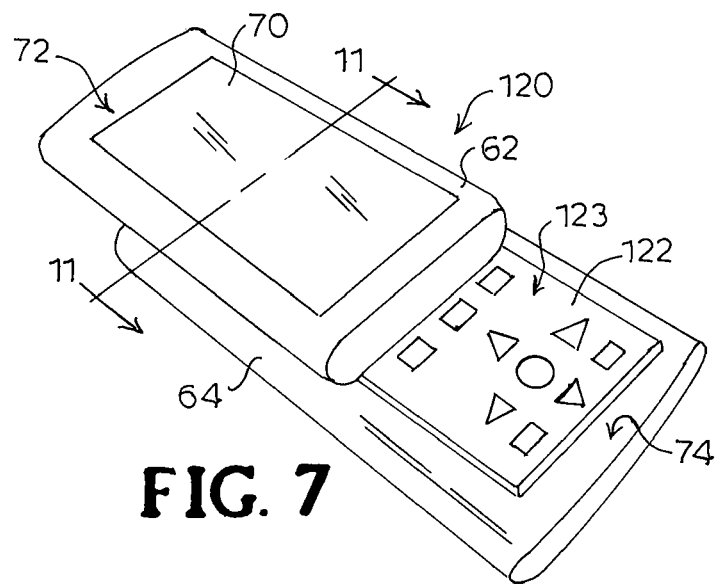
FIG. 7 is a top perspective view of another embodiment of a two-way sliding mobile terminal according to the present invention, in an open position.
Figure 9:
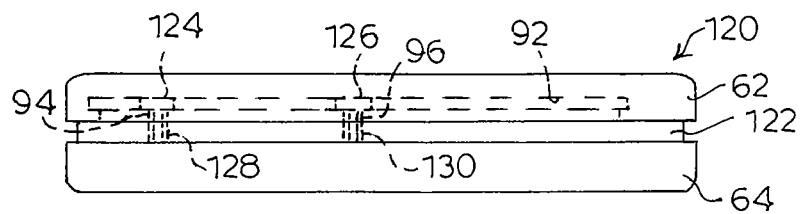
FIG. 9 is a side elevation view of the mobile terminal of FIG. 7, with the mobile terminal in a closed position.
Figure 10:
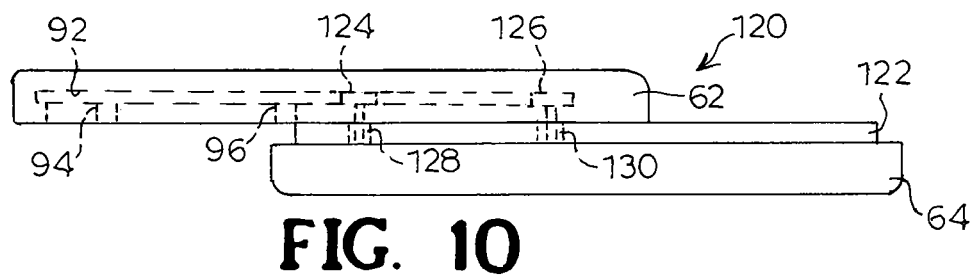
FIG. 10 is a side elevation view of the mobile terminal of FIG. 7, with the mobile terminal in an open position.
Figure 11:
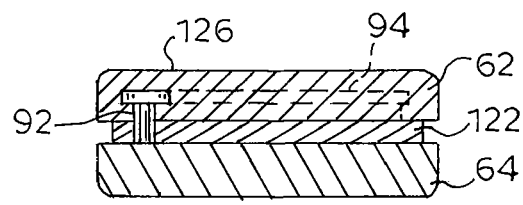
FIG. 11 is a section view of the mobile terminal of FIG. 7 taken along line 11-11 of FIG. 7.
Figure 8:
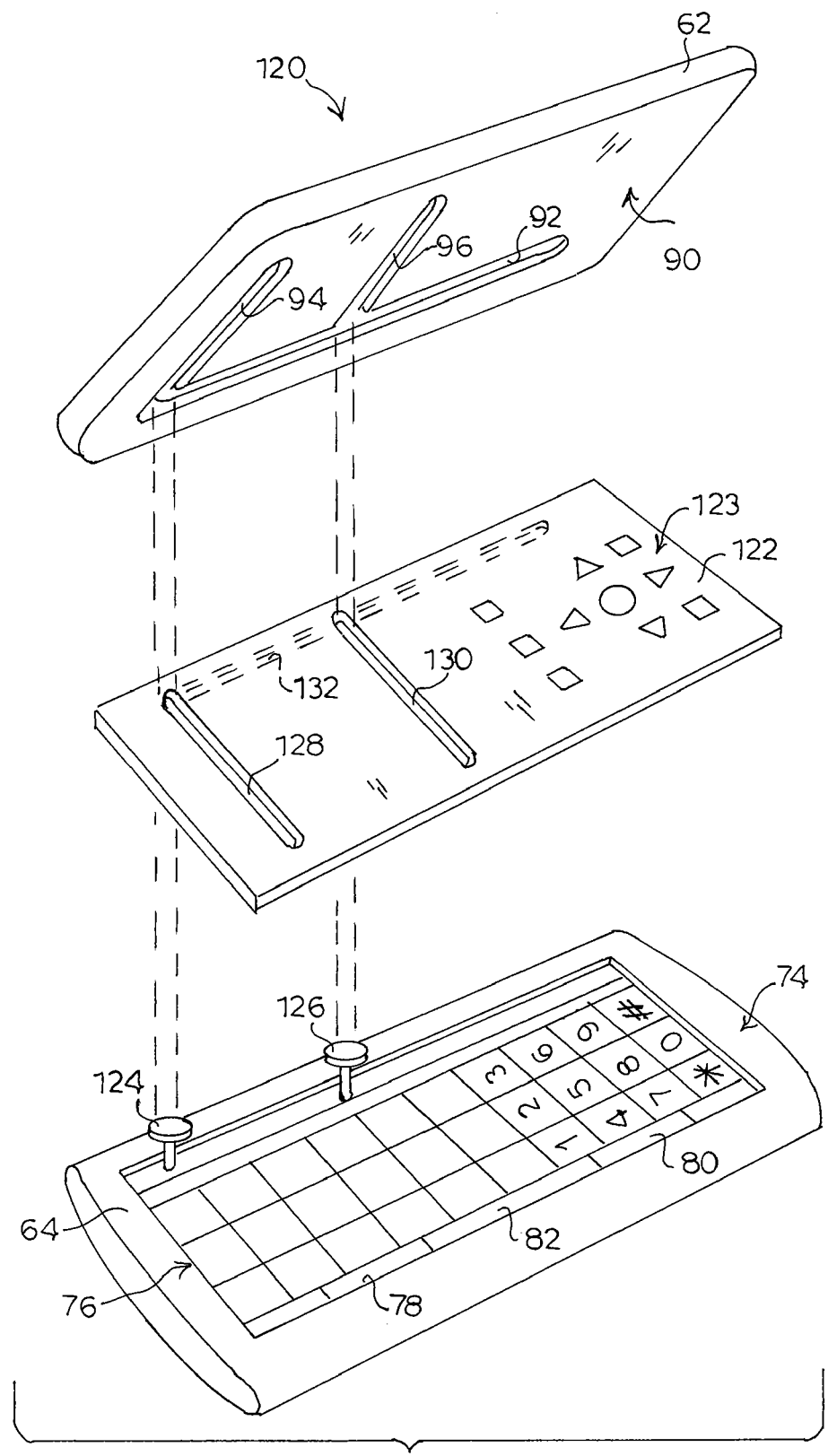
FIG. 8 is an exploded view of the mobile terminal of FIG. 7.

FIGS. 7-11 show another embodiment of a terminal 120, including a central overlay 122. FIG. 7 shows the terminal 120 in the longitudinally open position. This terminal 120 looks the same as the terminal 60 of FIG. 1 when in the closed position. The overlay 122 may include navigation indications 123 or other input indications that are positioned over keys at the end of the alphanumeric keypad 74 (keys not visible), and may be opaque and compliant. FIG. 8 shows an exploded view with the overlay 122 interposed between the top housing 62 and the bottom housing 64. The top housing 62 and bottom housing 64 may be similar to those in the embodiment without the overlay 122 (FIGS. 1-6), except the pins 124, 126 may be longer in order to provide space for the overlay 122. The overlay 122 includes two lateral slots 128, 130 in this embodiment. The lateral slots 128, 130 allow the top housing 62 and bottom housing 64 to slide laterally relative to each other independent of the overlay 122; the pins 124, 126 slide within the slots 128, 130 without requiring the overlay 122 to move with the bottom housing 64, meaning that when the bottom housing 64 slides laterally, the overlay 122 will remain hidden beneath the top housing 62. A physical block on the top housing 62 could be used to prevent the overlay 122 from sliding due to friction. On the contrary, when the top housing 62 and bottom housing 64 slide longitudinally relative to each other, there is no longitudinal slot for the pins 124, 126 to slide in, and the overlay 122 is forced by the pins 124, 126 to slide out from under the top housing 62 to cover the face 76 of the bottom housing 64. Alternatively, a longitudinal slot 132 could be provided that allows the bottom housing 64 to slide longitudinally without the overlay 122; longitudinal sliding of the overlay 122 could be optional as desired by the user, and could be manually implemented. FIGS. 9 and 10 show side elevation views with the mobile terminal 120 in the closed and longitudinally open positions, respectively; FIG. 11 is a cross-section view along the line 11-11 as shown in FIG. 7.

Figure 12:
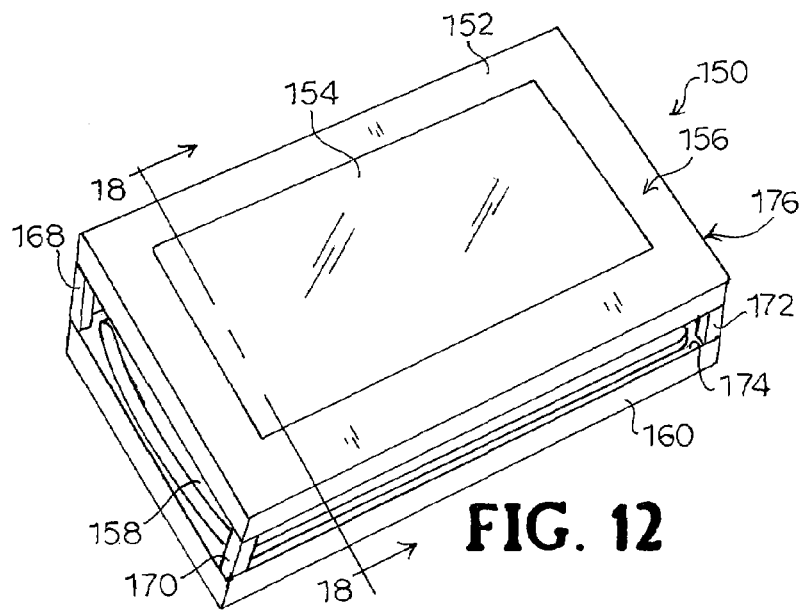
FIG. 12 is a top perspective view of another embodiment of a two-way sliding mobile terminal according to the present invention, in a closed position.
Figure 13:
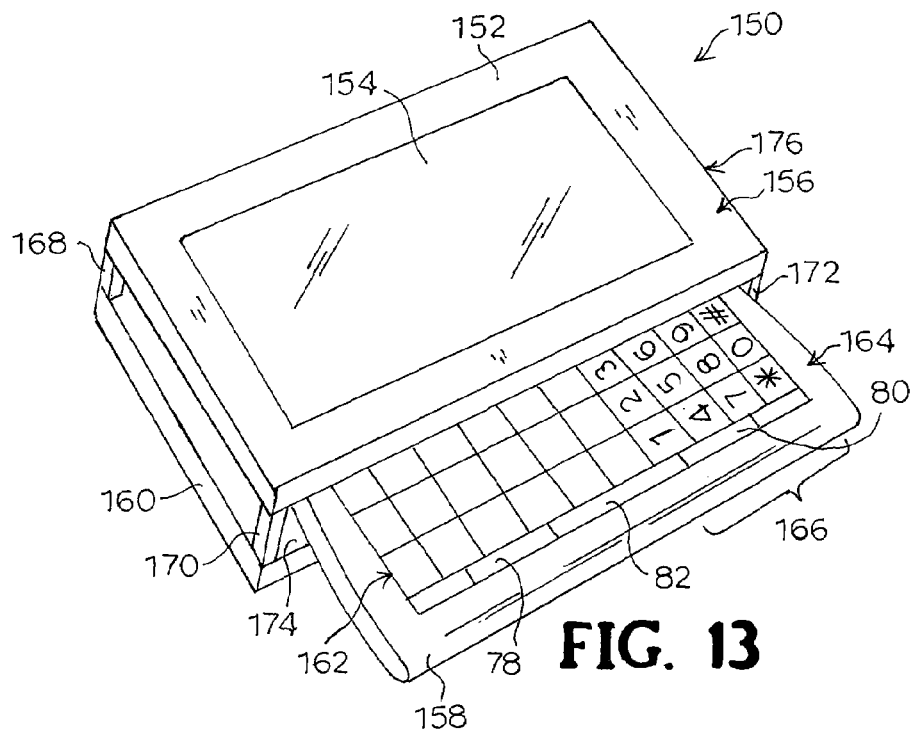
FIG. 13 is a top perspective view of the mobile terminal of FIG. 12 in an open position.
Figure 14:
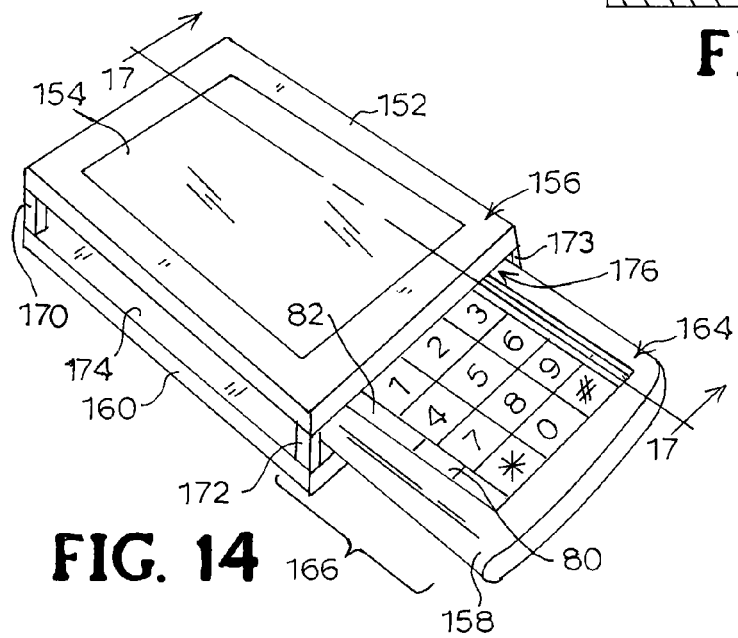
FIG. 14 is a top perspective view of the mobile terminal FIG. 12 in another open position.

FIGS. 12-18 show a third embodiment of a mobile terminal 150 with two-way sliding capability. In addition to a top housing 152 with a display 154 on a top face 156 and a bottom housing 158, a casing 160 is mounted to the top housing 152 that substantially encloses the bottom housing 158 when the bottom housing 158 is in a central, closed position. FIG. 12 shows such a closed position. FIG. 13 shows the terminal 150 in an open position for PDA mode resulting from lateral sliding, with an alphanumeric keypad 162 on the top face 164 of the bottom housing 158 exposed. FIG. 14 shows an open position for phone mode resulting from longitudinal sliding, exposing dual use keys 166 that form a numeric keypad. Connections 168, 170, 172, 173 (FIGS. 12-14) between the top and bottom housings 152, 158 are made at each corner. At least two sides 174, 176 of the enclosure are left open to allow lateral and longitudinal relative sliding of the housings 152, 158. The connections 168, 170, 172, 173 of the casing 160 to the top housing 152 need to be placed outward of the limits of the bottom housing 158 so as to allow space for the bottom housing 158 to slide between the connections 168, 170, 172, 173.

Figure 15:
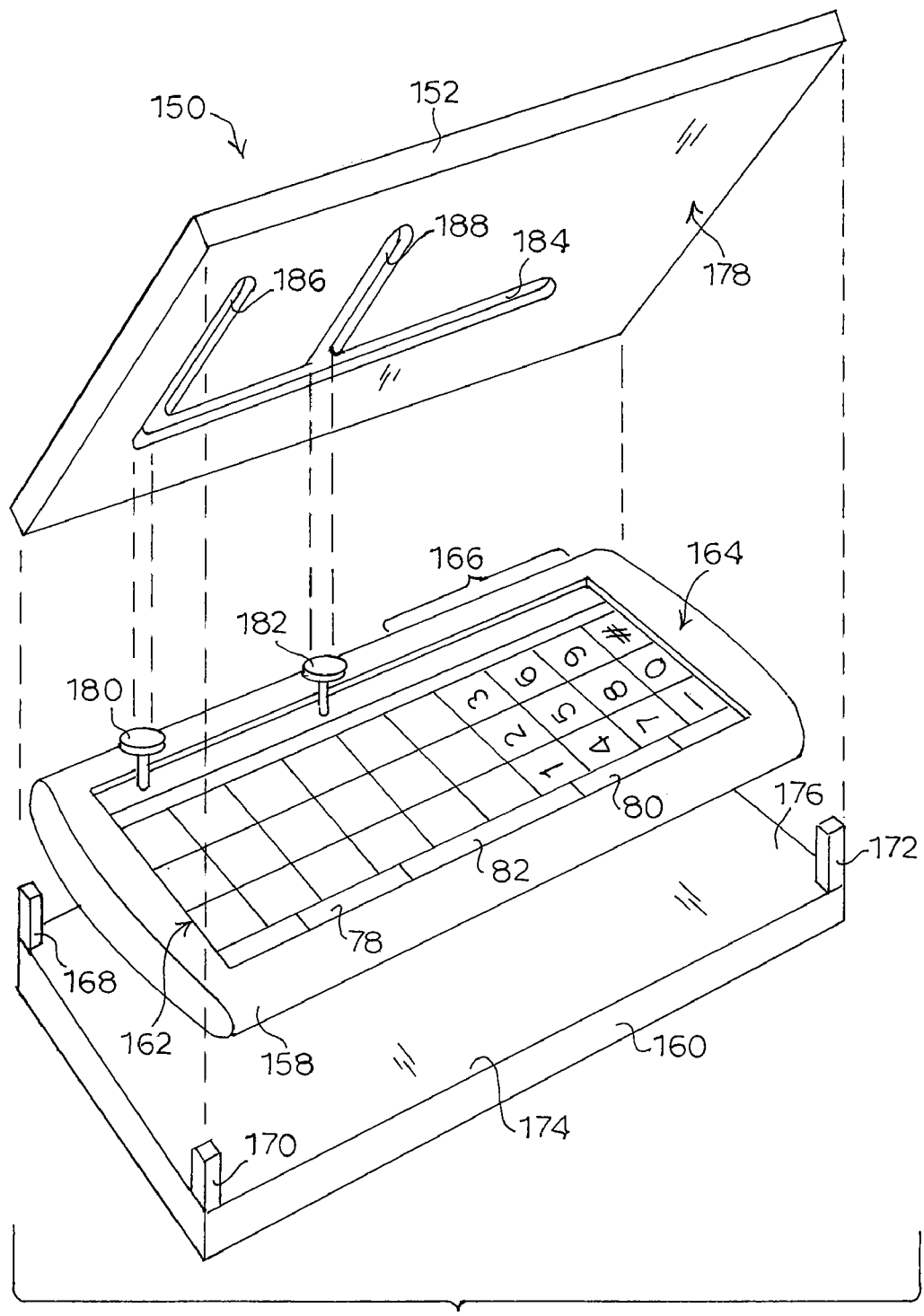
FIG. 15 is an exploded view of the mobile terminal of FIG. 12.

FIG. 15 shows an exploded view of the mobile terminal 150. The bottom or inner face 178 of the top housing 152 may be similar to that shown in FIG. 6, except the magnets are omitted from FIG. 15 for clarity. Pins 180, 182, longitudinal groove 184, and lateral grooves 186, 188 may function similarly to those previously discussed, but again pins 180, 182 and grooves 184, 186, 188 need not be shaped as shown. Instead of having a head as shown, the pins could, for example, be straight, without a head, and be received in straight-walled grooves. The housings 152, 158 could be secured together by being held in place with the casing 160 or other means. It is to be understood that the pins could be any shape to be received in grooves and allow a sliding relationship between the top housings 62, 152 and bottom housings 64, 158.

Figure 16:
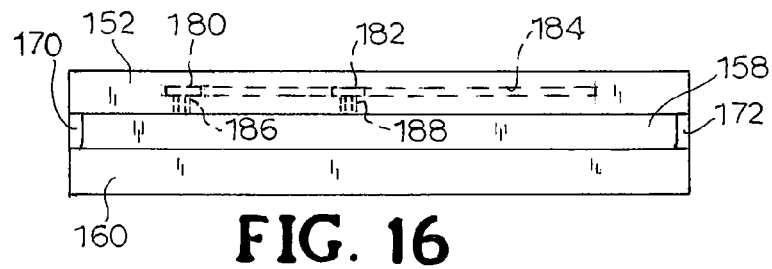
FIG. 16 is a side elevation view of the mobile terminal of FIG. 12.
Figure 17:
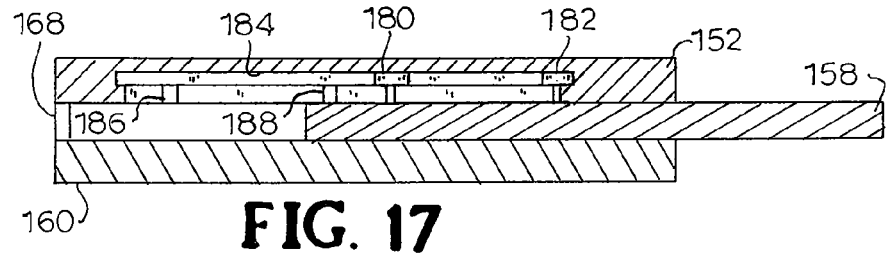
FIG. 17 is a section view of the mobile terminal of FIG. 12 taken along line 17-17 of FIG. 14.
Figure 18:
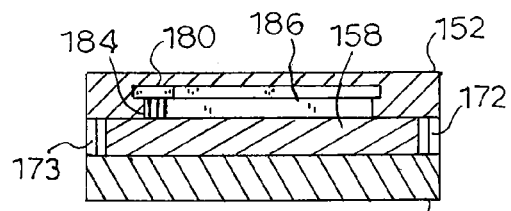
FIG. 18 is a section view of the mobile terminal of FIG. 12 taken along line 18-18 of FIG. 12.

FIG. 16 shows a longitudinal elevation view of the top housing 152, bottom housing 158, casing 160, and connections 170, 172. FIGS. 17 and 18 show respectively a longitudinal section view and cross-section view of the top housing 152, bottom housing 158, grooves 184, 186, 188, pins 180, 182, casing 160, and connections 168, 170, 172, 173.

Figure 19:
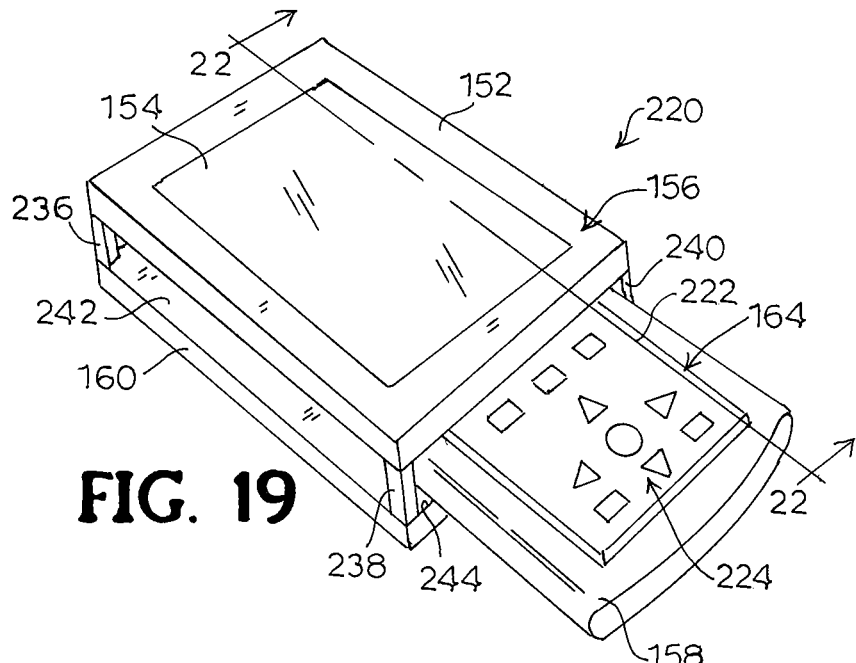
FIG. 19 is a top perspective view of another embodiment of a two-way sliding mobile terminal according to the present invention, in an open position.

FIGS. 19-23 show a fourth embodiment of a mobile terminal 220, including a central overlay 222 and a casing 160. This embodiment of a terminal 120 looks the same as the terminal 150 of FIG. 12 when in the closed position. FIG. 19 shows that the overlay 222 may include navigation indications 224 or other input indications. The navigation indications 224 are positioned over keys at the end of the alphanumeric keypad 162, shown in FIG. 20. The overlay 222 is interposed between the top housing 152 and the bottom housing 158 and includes two lateral slots 226, 228. The top housing 152 and bottom housing 158 may be similar to those in the embodiment 150 with the casing 160 but without the overlay 222 (FIGS. 12-18), except the pins 230, 232 may be longer in order to provide space for the overlay 222. The lateral slots 226, 228 allow the top housing 152 and bottom housing 158 to slide laterally relative to each other independent of the overlay 222; the pins 230, 232 slide within the slots 226, 228 without requiring the overlay 222 to move with the bottom housing 158, meaning that when the bottom housing 158 slides laterally, the overlay 222 will remain hidden beneath the top housing 152. A physical block on the top housing could be used to prevent the overlay from sliding due to friction. When the top housing 152 and bottom housing 158 slide longitudinally relative to each other, there is no longitudinal slot for the pins 230, 232 to slide in, and the overlay 222 is forced by the pins 230, 232 to slide out from under the top housing 152 to cover the face 164 of the bottom housing 158. Alternatively, a longitudinal slot 229 could be provided to allow optional longitudinal sliding and use of the overlay 222. Connections 234, 236, 238 attach the casing 160 to the top housing 152. As with the connections 168, 170, 172, 173 of the terminal 150 without the overlay 220, the connections 234, 236, 238, 240 must be outside the limits of the bottom housing 158 to allow passage between the connections 234, 236, 238, 240 via openings 242, 244.

Figure 21:
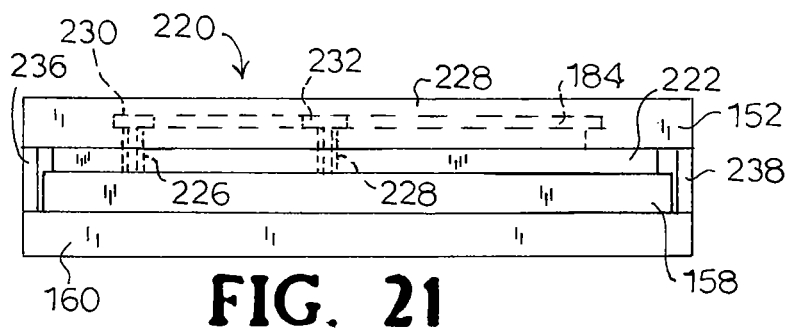
FIG. 21 is a side elevation view of the mobile terminal of FIG. 19, with the mobile terminal in a closed position.
Figure 22:
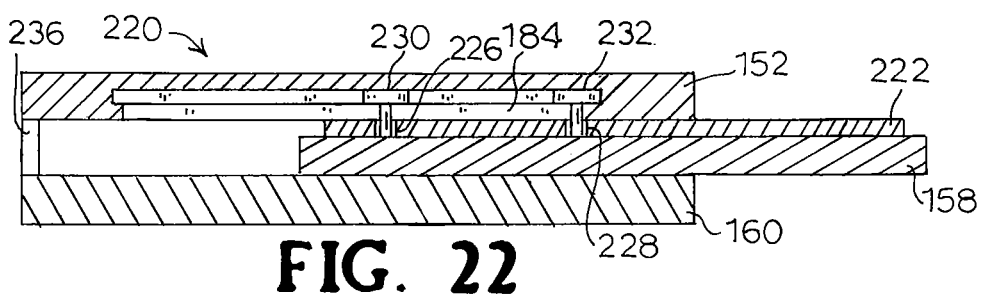
FIG. 22 is a section view of the mobile terminal of FIG. 19 taken along line 22-22 of FIG. 19.
Figure 23:
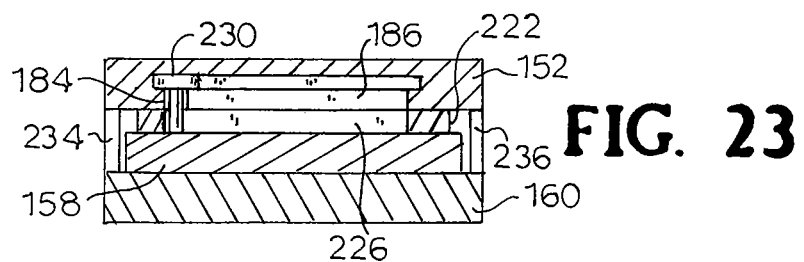
FIG. 23 is a section view of the mobile terminal of FIG. 19 taken along the line 18-18 of FIG. 12.
Figure 20:
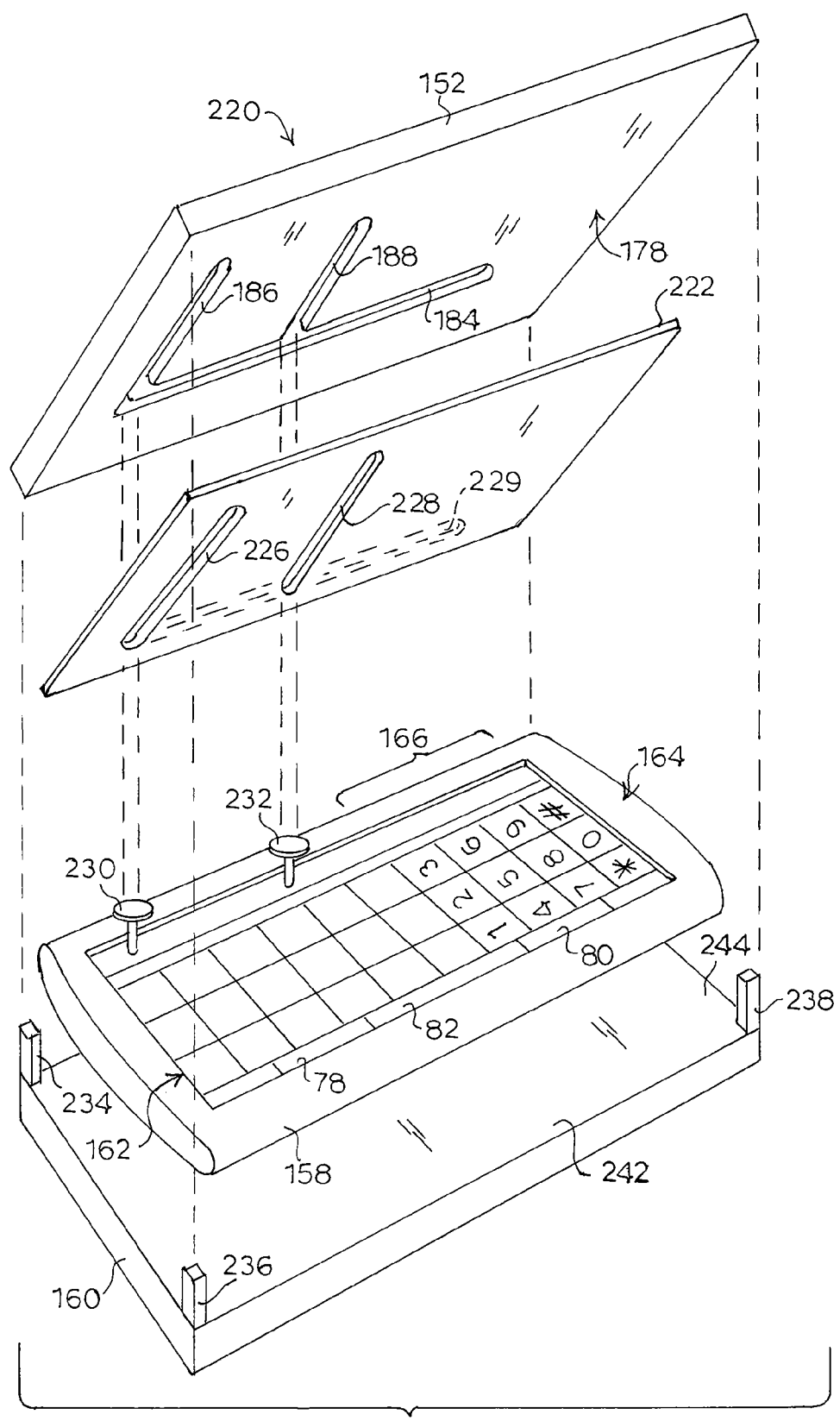
FIG. 20 is an exploded view of the mobile terminal of FIG. 19.

FIG. 21 shows a side elevation view with the mobile terminal 220 in a closed position; FIG. 22 is a longitudinal section view along the line 22-22 as shown in FIG. 19, with the terminal 220 longitudinally open; FIG. 23 is a cross-section view along the line 18-18 as shown in FIG. 12 with the terminal in the closed position.

Figure 24:
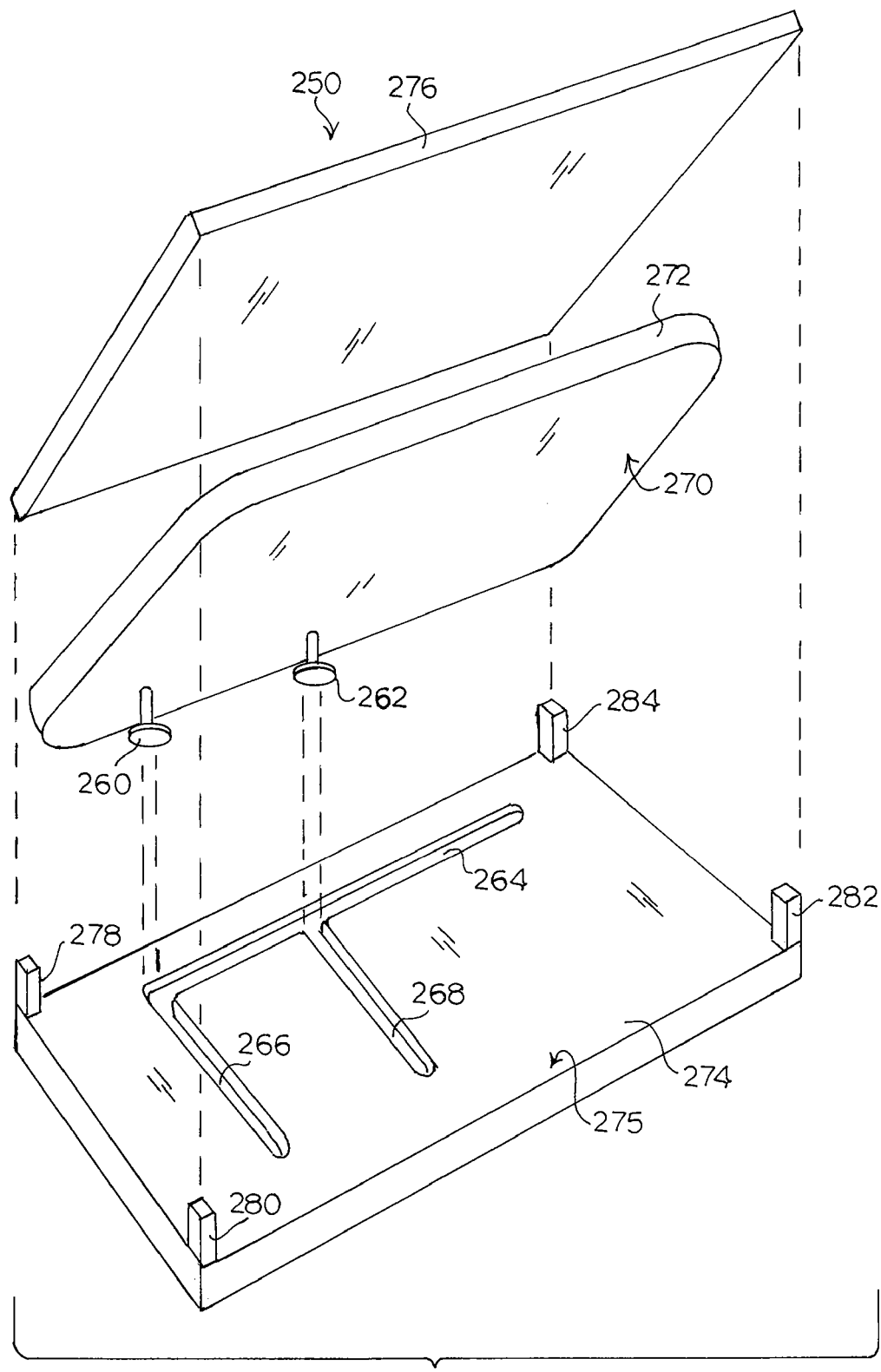
FIGS. 24 and 25 are exploded views of other embodiments of two-way sliding mobile terminals according to the present invention.

As an alternative to the pin and groove relationship of the top housing 152 and bottom housing 158, as shown in the embodiment of a mobile terminal 250 of FIG. 24, pins 260, 262 and grooves 264, 266, 268 could be located in the lower surface 270 of the bottom housing 272 and the casing 274 inner surface 275. The top housing 276 would have no pins or grooves, and there may be connections 278, 280, 282, 284 at each corner of the top housing 276 and casing 274.

Figure 25:
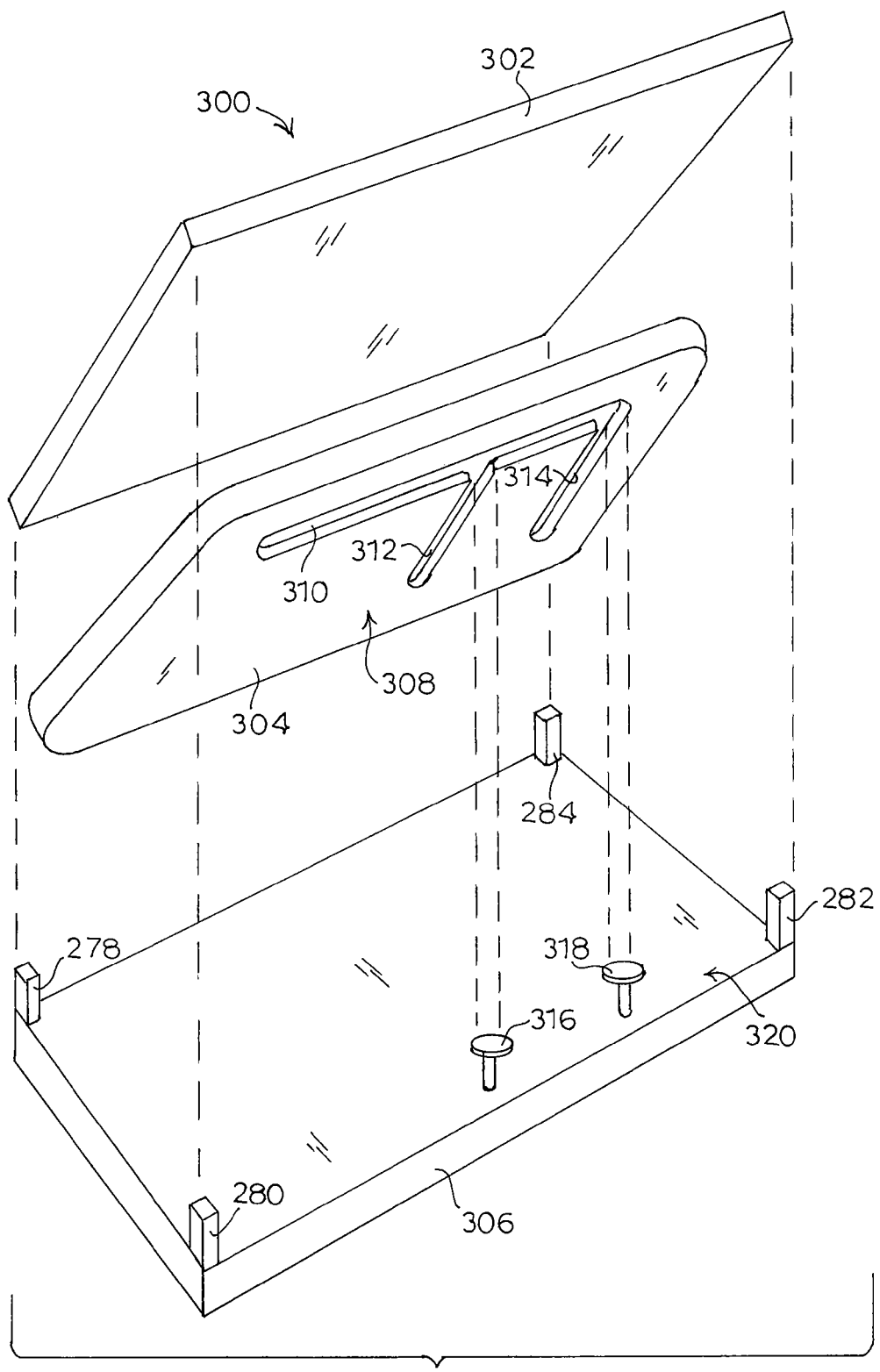

A yet further alternative embodiment of a mobile terminal 300 is shown in FIG. 25. This embodiment includes a top housing 302, a bottom housing 304, a casing 306, and connections 278, 280, 282, 284 that mount the casing 306 to the top housing 302. The bottom surface 308 of the bottom housing 304 includes grooves 310, 312, 314 in which pins 316, 318 that extend from the casing 306 inner surface 320 are disposed. The position of the pins 316, 318 and the orientation of the grooves 310, 312, 314 are reversed from that previously discussed in order to provide for comparable movement.

Figure 26:
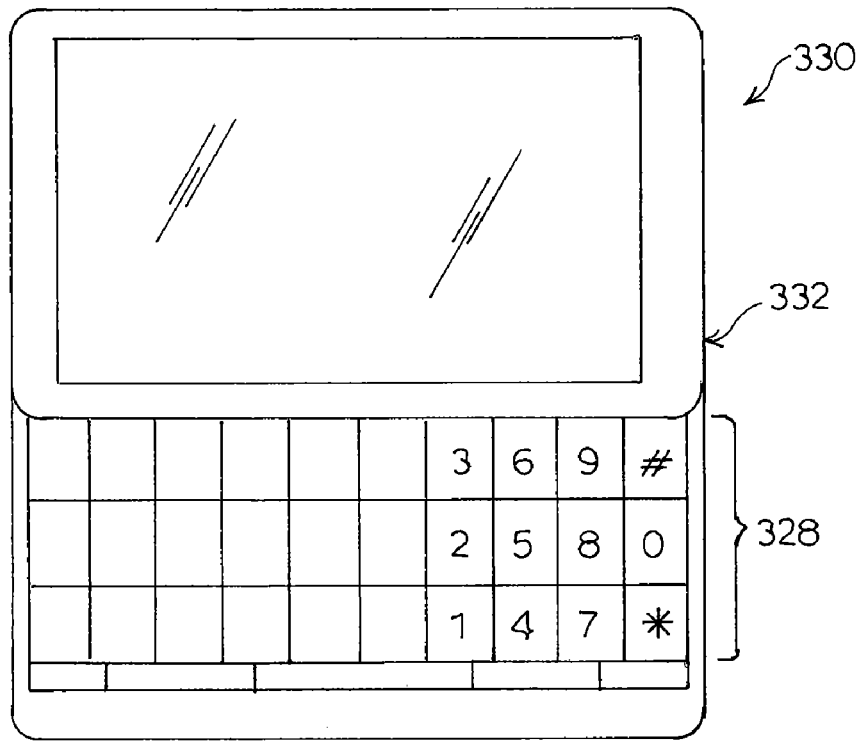
FIGS. 26-30 are embodiments of plan views of numeric keys on alphanumeric keypads and the corresponding indications on overlays according to the present invention.
Figure 27:
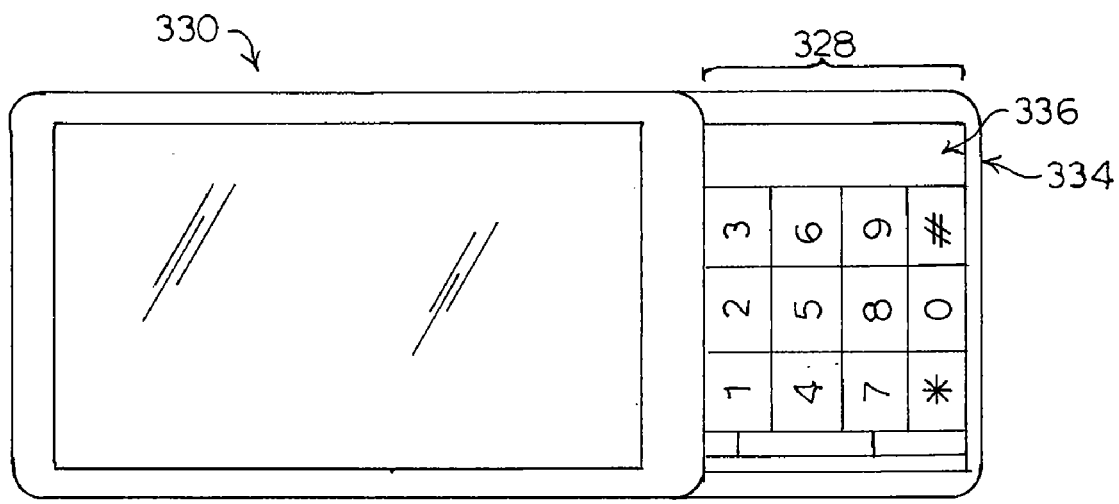
Figure 28:
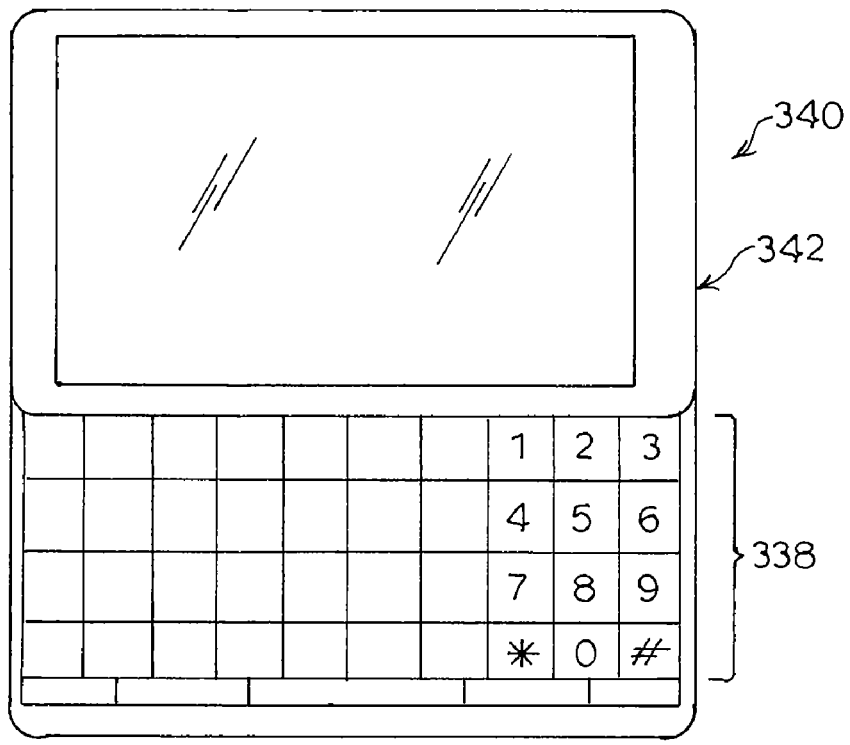
Figure 29:
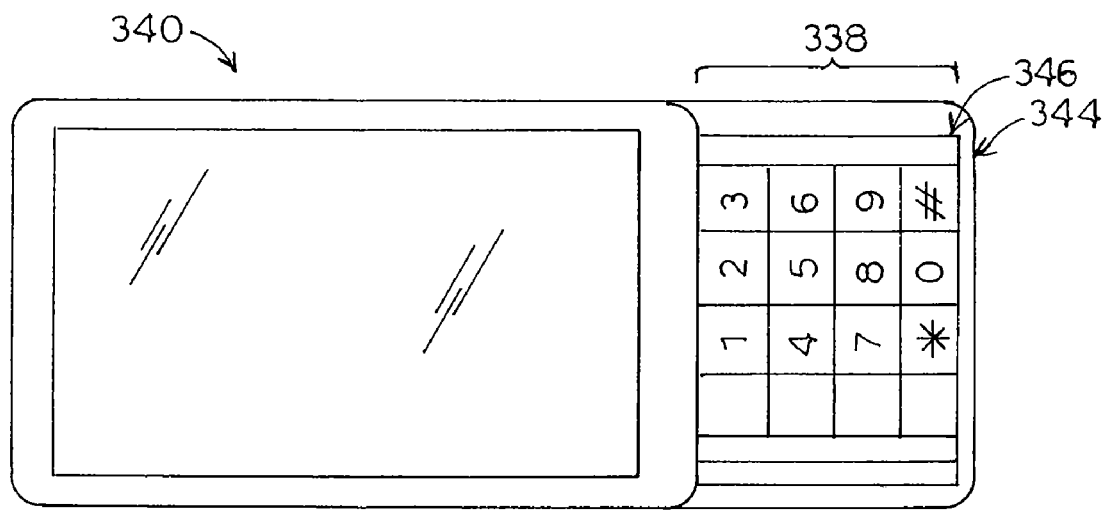
Figure 30:
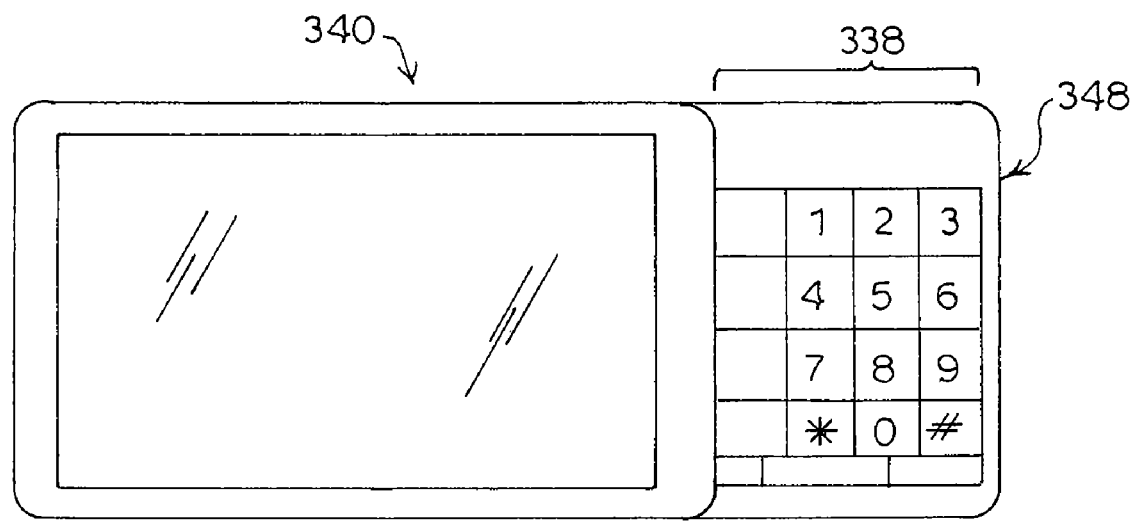

FIGS. 26-29 show embodiments of mobile terminals and how an overlay may alter the appearance of the keys, in addition to replacing numbers with navigation indications. As shown in FIGS. 26 and 27, the input signals assigned to the keys 328 in a mobile terminal 330 may remain the same between PDA mode 332 and phone mode 334, with only the orientation of the labels changing by application of the overlay 336. Or, the signals from the keys could vary based on mode, as previously discussed. For example, FIGS. 27 and 28 show labels and inputs for the keys 338 of the mobile terminal 340 changing to allow phone keypad configuration in both PDA mode 342 and phone mode 344 by sue of an overlay 346. FIG. 30 shows an example of a configuration of keys 338 that is a phone mode variation 348 in which the overlay does not slide, but remains hidden. The keys 338 retain the same meaning and labels as in PDA mode 342, and the phone may used in a sideways orientation. The selection of labels may also be influenced by the number of columns and rows that are available on the mobile terminal.

One of ordinary skill in the handheld communication and electrical device arts will quickly recognize that the invention has other applications in other environments. It will also be understood by someone of ordinary skill in the art that the functionality of mobile terminals may vary widely. In fact, many embodiments and implementations are possible. The following claims are in no way intended to limit the scope of the invention to the specific embodiments described. In addition, the recitation "means for" is intended to evoke a means-plus-function reading of an element in a claim, whereas, any elements that do not specifically use the recitation "means for," are not intended to be read as means-plus-function elements, even if they otherwise include the word "means." It should be understood by those skilled in the art that the foregoing modifications as well as various other changes, omissions and additions may be made without parting from the spirit and scope of the present invention.

What is claimed is:

1. A two-way sliding mobile terminal, comprising:
 a first housing having a longitudinal axis and including a first housing inner face, at least one pin projecting from the first housing inner face, and a first housing outer face; and
 a second housing including a second housing inner face and a second housing outer face, wherein the second housing inner face opposes the first housing inner face and includes at least one longitudinal groove parallel to the longitudinal axis and at least one lateral groove perpendicular to and intersecting the at least one longitudinal groove, and the at least one pin is slidably disposed in at least one groove.

2. The two-way sliding mobile terminal of claim 1, wherein there is a plurality of pins aligned in at least one line parallel to the longitudinal axis, there is at least one longitudinal groove that can receive the at least one line of pins, and there is a plurality of lateral grooves each of which can receive at least one pin from the at least one line of pins.

3. The two-way sliding mobile terminal of claim 2, wherein there are two pins in alignment, the two pins can be received in one longitudinal groove, and one of the two pins can be received in one lateral groove while the other one of the two pins is received in another lateral groove.

4. The two-way sliding mobile terminal of claim 1, wherein the first and second housings can slide in longitudinal and lateral directions relative to each other.

5. The two-way sliding terminal of claim 4, wherein in a first position the housings are in registration, in a second position the housings are laterally offset, and in a third position the housings are longitudinally offset.

6. The two-way sliding mobile terminal of claim 5, wherein in the second position a numeric keypad is exposed.

7. The two-way sliding mobile terminal of claim 5, wherein in the third position an alphanumeric keypad is exposed.

8. The two-way sliding mobile terminal of claim 5, further comprising a keypad including keys on the first housing inner face, wherein the longitudinal groove includes an electrical conductor that completes or shorts out a circuit depending on the relative position of the housings to control the function of selected keys.

9. The two-way sliding mobile terminal of claim 5, further comprising:
a keypad including keys on the first housing inner face; and
means for controlling the function of selected keys depending on the relative position of the housings.

10. The two-way sliding mobile terminal of claim 1, wherein the first housing includes an alphanumeric keypad.

11. The two-way sliding mobile terminal of claim 1, wherein the second housing includes a display.

12. The two-way sliding mobile terminal of claim 1, further comprising a central overlay interposed between the first and second housings, the central overlay including a first major surface opposing the inner face of the first housing and a second major surface opposing the inner face of the second housing.

13. The two-way sliding mobile terminal of claim 12, wherein the central overlay may slide with the first housing to be exposed in part when the first housing slides longitudinally relative to the second housing, and the central overlay may remain hidden by the second housing when the first housing slides laterally relative to the second housing.

14. The two-way sliding mobile terminal of claim 13, further comprising a keypad on the inner face of the first housing, wherein when the first and second housing slide longitudinally relative to each other at least a portion of the keypad extends out from the second housing, and the central overlay may substantially cover the portion of the keypad that extends out from second housing.

15. The two-way sliding mobile terminal of claim 14, wherein the central overlay includes numeric indications on the second major surface.

16. The two-way sliding mobile terminal of claim 14, wherein the central overlay includes navigational indications on the second major surface.

17. The two-way sliding mobile terminal of claim 14, wherein the central overlay is opaque and compliant.

18. The two-way sliding mobile terminal of claim 14, wherein there is at least one lateral slot through the central overlay through which the at least one pin may extend and slide along, and the at least one slot is in registration with the at least one lateral groove.

19. The two-way sliding mobile terminal of claim 18, wherein there is at least one longitudinal slot.

20. The two-way sliding mobile terminal of claim 18, wherein there is an absence of longitudinal slots.

21. The two-way sliding mobile terminal of claim 14, wherein there are two lateral grooves, two pins in longitudinal alignment, and two lateral slots through the central overlay in registration with the two lateral grooves, and one pin may extend through and slide along each lateral slot.

22. The two-way sliding mobile terminal of claim 1, wherein there are different relative positions between the housings resulting from lateral and longitudinal sliding, and the keypad includes keys with labels, and further comprising means for changing labels associated with a plurality of keys depending on the relative positions of the housings.

23. The two-way sliding mobile terminal of claim 1, wherein there are different relative positions between the housings resulting from lateral and longitudinal sliding, and the keypad includes keys, and further comprising means for changing the functions associated with a plurality of keys depending on the relative positions of the housings.

24. A two-way sliding mobile terminal, comprising:
a first housing having a longitudinal axis and including a first housing inner face, a first housing outer face, and two pins projecting from the first housing inner face in longitudinal alignment; and
a second housing including:
a second housing inner face opposing the first housing inner face;
a second housing outer face;
one longitudinal groove in the second housing inner face parallel to the longitudinal axis; and
two lateral grooves in the second housing inner face perpendicular to and intersecting the longitudinal groove,
wherein the two pins may be slidably received in the longitudinal groove, and each pin may be slidably received in a lateral groove,
wherein the first and second housings can slide in longitudinal and lateral directions relative to each other, and
wherein in a first position the housings are in registration, in a second position the housings are laterally offset, and in a third position the housings are longitudinally offset.

25. A two-way sliding mobile terminal, comprising:
a first housing having a longitudinal axis and including a first housing first face, at least one pin projecting from the first housing first face, and a first housing second face;
a second housing including a second housing outer face and a second housing inner face, wherein the second housing inner face opposes the first housing first face and includes at least one longitudinal groove parallel to the longitudinal axis and at least one lateral groove perpendicular to and intersecting the at least one longitudinal groove, and the at least one pin is slidably disposed in at least one groove; and
a casing mounted to the second housing and including an inner face opposing the first housing second face.

26. The two-way sliding mobile terminal of claim 25, wherein there is a plurality of pins aligned in at least one line parallel to the longitudinal axis, there is at least one longitudinal groove that can receive the at least one line of pins, and there is a plurality of lateral grooves each of which can receive at least one pin from the at least one line of pins.

27. The two-way sliding mobile terminal of claim 26, wherein there are two pins in alignment, the two pins can be received in one longitudinal groove, and one of the two pins can be received in one lateral groove while the other one of the two pins is received in another lateral groove.

28. The two-way sliding mobile terminal of claim 25, wherein the first and second housings can slide in longitudinal and lateral directions relative to each other.

29. The two-way sliding terminal of claim 28, wherein in a first position the housings are in registration, in a second position the housings are laterally offset, and in a third position the housings are longitudinally offset.

30. The two-way sliding mobile terminal of claim 29, wherein in the second position a numeric keypad is exposed.

31. The two-way sliding mobile terminal of claim 29, wherein in the third position an alphanumeric keypad is exposed.

32. The two-way sliding mobile terminal of claim 29, further comprising a keypad including keys on the first housing first face, wherein the longitudinal groove includes an electrical conductor that completes or shorts out a circuit depending on the relative position of the housings to control the function of selected keys.

33. The two-way sliding mobile terminal of claim 29, further comprising:
    a keypad including keys on the first housing first face; and
    means for controlling the function of selected keys depending on the relative position of the housings.

34. The two-way sliding mobile terminal of claim 25, wherein the first housing includes an alphanumeric keypad.

35. The two-way sliding mobile terminal of claim 25, wherein the second housing includes a display.

36. The two-way sliding mobile terminal of claim 25, further comprising a central overlay interposed between the first and second housings, the central overlay including a first major surface opposing the first face of the first housing and a second major surface opposing the inner face of the second housing.

37. The two-way sliding mobile terminal of claim 36, wherein the central overlay may slide with the first housing to be exposed in part when the first housing slides longitudinally relative to the second housing, and the central overlay may remain hidden by the second housing when the first housing slides laterally relative to the second housing.

38. The two-way sliding mobile terminal of claim 37, further comprising a keypad on the first face of the first housing, wherein when the first and second housing slide longitudinally relative to each other at least a portion of the keypad extends out from the second housing, and the central overlay may substantially cover the portion of the keypad that extends out from second housing.

39. The two-way sliding mobile terminal of claim 38, wherein the central overlay includes numeric indications on the second major surface.

40. The two-way sliding mobile terminal of claim 38, wherein the central overlay includes navigational indications on the second major surface.

41. The two-way sliding mobile terminal of claim 38, wherein the central overlay is opaque and compliant.

42. The two-way sliding mobile terminal of claim 38, wherein there is at least one lateral slot through the central overlay through which the at least one pin may extend and slide along, and the at least one slot is in registration with the at least one lateral groove.

43. The two-way sliding mobile terminal of claim 42, wherein there is at least one longitudinal slot.

44. The two-way sliding mobile terminal of claim 42, wherein there is an absence of longitudinal slots.

45. The two-way sliding mobile terminal of claim 38, wherein there are two lateral grooves, two pins in longitudinal alignment, and two lateral slots through the central overlay in registration with the two lateral grooves, and one pin may extend through and slide along each lateral slot.

46. The two-way sliding mobile terminal of claim 25, wherein there are different relative positions between the housings resulting from lateral and longitudinal sliding, and the keypad includes keys with labels, and further comprising means for changing labels associated with a plurality of keys depending on the relative positions of the housings.

47. The two-way sliding mobile terminal of claim 25, wherein there are different relative positions between the housings resulting from lateral and longitudinal sliding, and the keypad includes keys, and further comprising means for changing the functions associated with a plurality of keys depending on the relative positions of the housings.

48. A two-way sliding mobile terminal, comprising:
    a first housing having a longitudinal axis and including a first housing first face, a first housing second face, and two pins projecting from the first housing first face in longitudinal alignment; and
    a second housing including:
    a second housing inner face opposing the first housing first face;
    a second housing outer face;
    one longitudinal groove in the second housing inner face parallel to the longitudinal axis; and
    two lateral grooves in the second housing inner face perpendicular to and intersecting the longitudinal groove; and
    a casing mounted to the second housing and including a casing inner face opposing the first housing second face,
    wherein the two pins may be slidably received in the longitudinal groove, and each pin may be slidably received in a lateral groove,
    wherein the first and second housings can slide in longitudinal and lateral directions relative to each other, and
    wherein in a first position the housings are in registration, in a second position the housings are laterally offset, and in a third position the housings are longitudinally offset.

49. A two-way sliding mobile terminal, comprising:
    a first housing having a longitudinal axis and including a first housing first face, at least one pin projecting from the first housing first face, and a first housing second face; and
    a second housing including a second housing outer face and a second housing inner face, wherein the second housing inner face opposes the first housing first face;
    a casing mounted to the second housing and including an inner surface opposing the first housing second face, and including at least one longitudinal groove parallel to the longitudinal axis and at least one lateral groove perpendicular to and intersecting the at least one longitudinal groove, and the at least one pin is slidably disposed in at least one groove.

50. A two-way sliding mobile terminal, comprising:
    a first housing including a first housing first face and a first housing second face, having a longitudinal axis, and including at least one longitudinal groove parallel to the longitudinal axis and at least one lateral groove perpendicular to and intersecting the at least one longitudinal groove;
    a second housing including a second housing outer face and a second housing inner face, wherein the second housing inner face opposes the first housing first face; and
    a casing mounted to the second housing and including a casing inner face opposing the first housing second face, and at least one pin projecting from the casing inner face, wherein the at least one pin is slidably disposed in at least one groove.

* * * * *

UNITED STATES PATENT AND TRADEMARK OFFICE
CERTIFICATE OF CORRECTION

PATENT NO. : 7,636,591 B2  Page 1 of 1
APPLICATION NO. : 11/380734
DATED : December 22, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Ninth Day of November, 2010

David J. Kappos
*Director of the United States Patent and Trademark Office*